United States Patent [19]

Smedberg

[11] 4,012,547
[45] Mar. 15, 1977

[54] HIGH PERFORMANCE HOT MELT ADHESIVE BACKSIZING COMPOSITIONS AND CARPET MADE THEREWITH

[75] Inventor: George Elmer Smedberg, Wilmington, Del.

[73] Assignee: E. I. Du Pont de Nemours and Company, Wilmington, Del.

[22] Filed: July 18, 1975

[21] Appl. No.: 597,140

Related U.S. Application Data

[63] Continuation-in-part of Ser. No. 509,562, Sept. 26, 1974, Pat. No. 3,914,489.

[52] U.S. Cl. .......................... 428/97; 260/28.5 AV; 260/887; 260/897 R; 260/897 A; 260/897 B; 260/901; 428/95; 428/96
[51] Int. Cl.$^2$ ................. D03D 27/00; D04H 11/00
[58] Field of Search ................. 428/96, 97, 95; 260/28.5 AV, 887, 897 R, 897 A, 897 B, 901

[56] References Cited

UNITED STATES PATENTS

| | | | |
|---|---|---|---|
| 3,583,936 | 6/1971 | Stahl | 260/28.5 AV |
| 3,914,489 | 10/1975 | Smedberg | 428/97 |

*Primary Examiner*—Marion E. McCamish

[57] ABSTRACT

Hot melt backsize compositions having high tensile elongation which result in tufted carpets having improved tuft bind comprise a blend of ethylene/vinyl ester copolymer, hydrocarbon resin, and, optionally, low molecular weight polyethylene, paraffin wax, antioxidant and filler.

10 Claims, No Drawings

HIGH PERFORMANCE HOT MELT ADHESIVE BACKSIZING COMPOSITIONS AND CARPET MADE THEREWITH

CROSS-REFERENCE TO RELATED APPLICATION

This application is a continuation-in-part of copending application Ser. No. 509,562, filed Sept. 26, 1974, now issued as U.S. Pat. No. 3,914,489.

BACKGROUND OF THE INVENTION

1. Field of the Invention

This invention relates to carpet backsizing, and more particularly it relates to hot melt backsizing compositions which result in carpets having high tuft bind.

2. Description of the Prior Art

Backsizing of tufted carpets with hot melt backsize adhesives has been known now for some years. U.S. Pat. No. 3,551,231 discloses a process for applying a hot melt backsize adhesive blend of ethylene/vinyl ester copolymer, petroleum wax, and a thermoplastic resin. Satisfactory carpets are made by applying a critical pressure on the tufted structure while it is in contact with the hot melt adhesive applicator roll. The necessity of maintaining such critical pressure during the adhesive application detracts from process flexibility.

U.S. Pat. No. 3,684,600 discloses the application of a low viscosity precoat adhesive to the backside of the tufted structure prior to the application of the hot melt backsize adhesive composition. By using the precoat adhesive, the necessity of maintaining a critical pressure on the carpet during the hot melt adhesive application can be eliminated. The backsize adhesive composition contains ethylene/vinyl ester copolymer, low molecular weight, low density polyethylene, microcrystalline wax, aliphatic thermoplastic hydrocarbon resin, dicyclopentadiene alkylation polymer, antioxidant and filler.

U.S. Pat. No. 3,583,936 discloses a hot melt backsize adhesive composition comprising an ethylene/vinyl ester or acrylate polymer, a wax of sufficiently high melting point to yield a blend softening point of at least 190° F., a blend of aliphatic thermoplastic hydrocarbon resin and a dicyclopentadiene alkylation polymer, and optionally a filler.

U.S. Pat. No. 3,745,054 relates to high filler content hot melt backsize adhesive compositions comprising ethylene/vinyl ester copolymer, paraffin wax, microcrystalline wax, aliphatic thermoplastic hydrocarbon resin, dicyclopentadiene alkylation polymer, antioxidant and filler.

Previously, filler containing hot melt blends have been used to produce carpets having tuft binds which generally average in the 6 to 10 lb. range. While this is generally adequate for domestic carpet (used in the home), higher tuft bind values will ensure greater durability. Considerably higher tuft binds (18 lb. average or greater), which up to the present has not been attainable, are desired by the carpet industry for contract carpet (used in schools, hotels, churches, industry, etc.) to ensure meeting typically severe service requirements.

SUMMARY OF THE INVENTION

The present invention provides hot melt blends which offer higher strength, as described below, than has been obtainable with hot melt blends developed and used heretofore. The key to the invention is the application of a novel tackifier resin system, which enhances the tensile elongation of the blends at equivalent tackifier cost and quantity. This in turn provides a substantial increase in the tuft bind values attainable for the final carpet as sold to consumers.

The new blend has utility in both the domestic carpet and contract carpet markets. Carpet for domestic use does not encounter severe wear conditions; hence, tuft bind values, etc., can be less than is essential for carpets for schools, motels and hotels, industrial buildings, etc. where traffic is severe. It is common in industry to use higher standards, requiring higher costs, for contract carpets. The present invention recognizes this distribution, and is applicable in both end use areas.

According to the present invention there is provided a composition having a tensile elongation of about 700–1500 percent, preferably at least about 900 percent comprising (A) about 15–30 (preferably about 18–22) weight percent ethylene/vinyl ester copolymer having a melt index of about 2 to 100 (preferably about 10–25), a copolymerized ethylene content of about 67 to 84 (preferably about 74–77) weight percent, a copolymerized vinyl ester content of about 16 to 33 (preferably about 23–26) weight percent, wherein the acid moiety of said vinyl ester contains 1–4 (preferably 2–3) carbon atoms, (B) about 30–70 (preferably about 40–50) weight percent of a hydrocarbon resin or a mixture of several hydrocarbon resins having a ring and ball softening point of about 50°–70° C. and a viscosity of 0.5 to 1.5 poise at 135° C., and optionally (C) 0 to about 5 weight percent of a low molecular weight ethylene homopolymer having a molecular weight of about 1500–4000, density of 0.91–0.96 g./cm.$^3$ and a melting point of about 220°–270° F., (D) 0 to about 5 weight percent of a paraffin wax, (E) an effective amount of an antioxidant, (F) 0 to about 40 weight percent filler, This composition is intended for lamination of contract carpets, however, it is technically suited to lamination of domestic carpets also, but is too costly for this market.

According to the present invention there are further provided contract-type carpets having improved tuft bind, at least an average of 18 pounds, obtained by the use of the above compositions and carrying out the backsizing according to the process of U.S. Pat. No. 3,551,231.

According to the present invention there is further provided a composition having a tensile elongation of about 50 to 400 percent preferably at least about 200 percent, comprising (A) about 3 to 15 (preferably about 5 to 10) weight percent ethylene/vinyl ester copolymer having a melt index of about 2 to 100 (preferably about 10–25), a copolymerized ethylene content of about 67 to 90 (preferably about 74–77) weight percent, a copolymerized vinyl ester content of about 10 to 33 (preferably about 23–26) weight percent, wherein the acid moiety of said vinyl ester contains 1–4 (preferably 2–3) carbon atoms, (B) about 15 to 40 (preferably about 25 to 35) weight percent of a hydrocarbon resin or a mixture of several hydrocarbon resins having a ring and ball softening point of about 50°–70° C. and a viscosity of 0.5 to 1.5 poise at 135° C., and optionally (C) 0 to about 3 weight percent of a low molecular weight ethylene homopolymer having molecular weight of about 1500–4000, density of 0.91–0.96 g./cm$^3$ and a melting point of about 220° F–270° F., (D) 0 to about 3 weight percent of a paraffin wax, (E) and effective amount of an antioxidant, and (F) about 40 to 75 weight percent filler. This composition is intended for lamination of domestic carpets.

According to the present invention there are further provided carpets for domestic uses having improved tuft bind, at least an average of 10 pounds, obtained by the use of the compositions of the preceding paragraph and carrying out the backsizing according to the process of U.S. Pat. No. 3,551,231.

DETAILED DESCRIPTION OF THE INVENTION

It has been discovered that a hot melt formation as described above will produce contract-type carpets having high tuft binds which have not been possible with the type of hot melt blends previously available for carpet backsizing. When more filler is added and the blend ingredient levels are adjusted to a seviceable viscosity range, a domestic carpet with tuft binds superior to those currently being sold is attained. The higher performance is attributed to the type of hydrocarbon resin [Component (B)] used and the resultant higher tensile elongation of the hot melt composition.

Hydrocarbon resins suitable for use in the high performance hot melt backsize compositions are classified as low molecular weight alkyl-aromatic hydrocarbon resins of the non-reactive, thermoplastic hydrocarbon types. Generally, they range in ring and ball softening point, as measured by ASTM E 28–67, from about 10°–120° C. and have viscosities measured at 135° C. of about 0.5–1.5 poises. Certain of these are low molecular weight dicyclopentadiene alkylation polymers and may be prepared according to U.S. Pat. No. 3,023,200. Included in this type are the "Piccovar" resins. The softening point of the resin, or of the mixture of resins, if more than one is employed, has to be between about 50°–70° C. If the softening point of the resin(s) is less than about 50° C. the blend viscosity and tensile strength are too low. If the softening point is higher than about 70° C. the blend viscosity is too high and the blend tensile elongation is too low to yield the desired high tuft bind.

Tables A and B list some of the commercially available hydrocarbon resins which, when used in the hot melt blend, yield the desired specifications for a high performance hot melt blend. The resins shown in Table A can be used alone, while others (Table B) must be used in admixture with one or more of the resins to obtain the desired physical properties in the final hot melt blend.

TABLE A
HYDROCARBON RESINS USED SINGLY

|  | Ring and Ball Softening Point, °C. |
|---|---|
| Resin 1 - "Piccovar" L 60 (Hercules Inc.) | 60 |
| Resin 2 - "Velsicol" XL39 (Velsicol Chemical Co.)[1] | 64 |
| Resin 3 - "Neville" DH-5-6 (Neville Chemical Co.) | 56 |

TABLE B
HYDROCARBON RESINS FOR USE WITH ANOTHER HYDROCARBON RESIN OR RESINS

|  | Ring and Ball Softening Point, °C. |
|---|---|
| Resin 4 - "Piccovar" 75 (Hercules Inc.) | 75 |
| Resin 5 - "Piccovar" L30 (Hercules Inc.) | 30 |
| Resin 6 - "Wingtack" 95 (Goodyear Tire and Rubber Co.)[2] | 95 |
| Resin 7 - "Wingtack" 10 (Goodyear Tire and Rubber Co.)[2] | 10 |
| Resin 8 - "Wingtack" 115 (Goodyear Tire and Rubber Co.)[2] | 115 |

[1]"Velsicol" XL39 is a thermoplastic hydrocarbon polymer derived from petroleum stocks having a highly aromatic structure and exhibiting a low level of unsaturation.
[2]"Wingtack" 95, 10 and 115 are synthetic polyterpene resins.

In Table I are presented data showing tensile elongation and other physical properties of hot melt adhesive compositions prepared with the indicated hydrocarbon resins.

TABLE I

| Blend No. | Hydrocarbon Resin | Properties of Final Filled Blend[1] | | | |
|---|---|---|---|---|---|
| | | Tensile lb./in.²[2] | Percent Tensile Elongation[2] | Ring and Ball Softening Point, °F. | Viscosity cps. at 310° F. |
| 1 | "Piccovar" L60 | 250 | 950 | 235 | 10,000 |
| 2 | "Velsicol" XL39 | 250 | 930 | 240 | 11,000 |
| 3 | (50/50) "Piccovar" 75/"Piccovar" L30 | 210 | 730 | 240 | 11,000 |
| 4 | (50/50) "Wingtack" 95/"Wingtack" 10 | 225 | 600 | 258 | 7,000 |
| 5 | (25/25/50) "Wingtack" 95/"Wingtack" 10/"Piccovar" L60 | 153 | 850 | 238 | 7,500 |
| 6 | (50/50) "Wingtack" 115/"Wingtack" 10 | 134 | 750 | 237 | 8,000 |
| 7 | (50/50) "Piccovar" L60/"Velsicol" XL39 | 234 | 889 | 240 | 10,500 |
| 8 | (25/75) "Piccovar" L60/"Velsicol" XL39 | 249 | 861 | 247 | 12,000 |
| 9 | (75/25) "Piccovar" L60/"Velsicol" XL39 | 249 | 962 | 245 | 11,000 |
| 10 | "Wingtack" 10 | 17 | 58 | 240 | 5,000 |
| 11 | "Piccovar" 75 | 350 | 40 | 249 | 26,000 |
| 12 | "Wingtack" 95 | 750 | 13 | 240 | 16,000 |

[1]Composition:
   19.8% ethylene/vinyl acetate copolymer, melt index 17–21, vinyl acetate content 25%.
   2.2% "Pacemaker" 53 wax, available from Cities Service Oil Company.
   2.9% "Polywax" 2000, polyethylene, molecular weight 2000, density 0.96, available from Petrolite Corp. (Bareco Div.).
   45.0% hydrocarbon resin
   0.1% BHT (butylated hydroxytoluene).
   30.0% No. 9 Whiting (CaCO₃ filler)
[2]as measured by ASTM D 1708-4 at a crosshead speed of 2 in./min.

Ethylene copolymers most useful in the present invention are copolymers of ethylene with vinyl esters of lower carboxylic acids. Such ethylene/vinyl ester copolymers can be prepared by known techniques, such as illustrated in U.S. Pat. No. 2,200,429 and U.S. Pat. No. 2,703,794. While an ethylene/vinyl acetate copolymer is preferred, other ethylene copolymers, such as those of vinyl formate, vinyl propionate, and vinyl butyrate, are useful as well.

The ethylene copolymers have melt indexes, as measured by ASTM 1238–52T, of about 2–100 (preferably 10–25) with polymerized ethylene content of about 67–90 (preferably 74–77) weight percent. Correspondingly, the polymerized ester content of useful ethylene copolymers is about 10–33 (preferable 23–26) weight percent. Additionally, ethylene copolymers containing minor amounts (i.e., up to about 3 weight percent) of polymerizable copolymers, such as acrylic acid, methyacrylic acid, itaconic acid, acrylamide, isobutyl acrylate, beta dimethylaminoethyl methacrylate, beta hydroxyethyl acrylate, diallyl maleate, diallyl phthalate, diallyl ether, or ethylene glycol dimethacrylate, are useful as well.

For contract carpet use the ethylene copolymer should be present in the hot melt blend in about 15–30 weight percent, preferably about 18–22 weight percent. Blends intended for domestic carpet application should contain about 3 to 15 weight percent, preferably about 5 to 10 percent, of the ethylene copolymer.

The optional low molecular weight polyethylene is present in the compositions of the present invention in sufficient amount to raise the softening point to a desired level. Thus a higher softening point, e.g., 235°–240° F., is of benefit to the carpet installer if it becomes necessary to heat-seam two adjacent carpet sections. This ingredient does not appreciably affect the elongation of the composition not the tuft bind of the finished carpet.

Optionally, an additional ingredient of suitable backsize adhesive compositions of this invention is paraffin wax. Paraffin waxes having a melting point of about 146° to 158° F., low needle point penetration (6–24 at 77° F.) and low oil content (0.1 to 0.25 percent) are preferred. Generally, their presence up to about 5 weight percent for contract carpet use and up to about 3 weight percent for domestic carpet use is suitable to facilitate application of the blend to the carpet by adjusting the melt-viscosity of the composition to the required level. The use of an antioxidant, such as butylated hydroxytoluene, in about 0.1–0.3 weight percent is advantageous.

Fillers, such as calcium carbonate, aluminum hydrate, etc. in about 0–75 weight percent concentration may optionally be incorporated into the compositions of the present invention as a low cost extender which improves carpet hand by providing additional bulk to the carpet. When compounding blends for contract carpet backsizing, care must be taken not to add more than about 40 weight percent filler so as not to reduce the elongation of the backsize adhesive composition or the tuft bind of the carpet below the required levels.

The particular manner in which the ingredients are added to formulate the composition of the present invention is not critical and can be accomplished by any of the well-known techniques.

The high strength of the carpet (in terms of tuft bind) made with compositions of the present invention is a significant advantage since in many uses (such as contract carpet) it is important to have a very high resistance to tuft pull out. A small child can readily damage a carpet having only a 5–10 pound tuft bind but would find it difficult or impossible to pull out tufts from a carpet having a 15 to 20 pound tuft bind. Quite likely the yarn would break before more than one or two tufts could be pulled out. Similarly, in applications such as hotel lobbies, theaters, etc., where a single tuft might readily be caught accidentally by users of the carpet, the high strength hot melt blend of the present invention would be of advantage.

Tuft bind, expressed in pounds, is measured by ASTM D 1335 or in some cases by a minor modification which gives comparable results. Values reported herein are the average of about 8–10 determinations. It will be appreciated that preparation of the carpet samples, following the teachings of U.S. Pat. No. 3,551,231, may lead to some variability in the tuft bind values because of the many variables that can affect the evenness of the coating and the uniformity of penetration of the hot melt into the carpet tufts. For prior art carpets, the spread is usually about 5–7 pounds while for carpets of the present invention the spread is usually about 3–4 pounds.

The following examples, wherein all parts and percentages are by weight, except where otherwise specified, further illustrate the advantages of the present invention. Two separate series of examples are given below. Series I covers blends intended primarily for contact carpet types. Series II covers blends intended primarily for domestic carpet use.

SERIES I — CONTACT CARPETS

COMPARATIVE EXAMPLES C1 TO C4

Reference Blend A, which is representative of the more successful filled prior art blends, was prepared:

REFERENCE BLEND A — Contract Carpets 15.0% ethylene/vinyl acetate copolymer, melt index 1.7–2.3, 25% vinyl acetate,
1.8% low molecular weight polyethylene, 3500 molecular weight, 240° F. melting point, "AC" 8, available from Allied Chemical Company,
10.2% microcrystalline wax, melting point 160° F., "Shellmax" 400, available from Shell Chemical Company,
17.2% unsaturated aliphatic thermoplastic hydrocarbon resin, melting point 100° C. ("Piccopale" 100SF, available from Hercules Inc.),
25.6% dicyclopentadiene alkylation polymer, melting point 77° F. ("Piccovar" AP 25, available from Hercules Inc.),
0.2% butylated hydroxytoluene (BHT),
30.0% calcium carbonate filler (No. 9 "Whiting").

Blend A had the following properties:

| | |
|---|---|
| Ring and ball softening point, ° F. | 210 |
| Viscosity, cps. at 310° F. | 14,000 |
| Tensile, lb./in.$^2$ | 400–500 |
| Tensile Elongation, % | 10–15 |

Strength characteristics of the carpet backsized with the above blend according to the process of U.S. Pat. No. 3,551,231 are given in Table II.

TABLE II

Properties of Contract-Type Carpets Made Using Reference Blend A

| Carpet No. | Backsize oz./yd.$^2$ | Tuft Bind, lb. | Scrim Bond, lb./3"[1] |
|---|---|---|---|
| C1 | 27.0 | 13.0 | 28.0 |
| C2 | 18.0 | 10.0 | 16.0 |

[1]determined by ASTM D-2724-13.

Data in Table II show that tuft bind values are good for many uses, but are below the ultimate goal — a carpet which cannot readily be harmed by accident, heavy wear, or a mischievous child.

An unfilled prior art blend, wherein the filler was omitted to maximize the amount of resinous binder and to improve the tuft bind thereby, was prepared. This composition is designated Reference Blend B.

REFERENCE BLEND B — CONTRACT CARPET 31.5% ethylene/vinyl acetate copolymer (10–25 melt index, 25% vinyl acetate), 3.5% paraffin wax, melting point 146° F. ("Pacemaker" 53, available from Cities Service Oil Company), 2.6% low molecular weight polyethylene (2000 molecular weight, 0.96 gm./cm.$^3$ density) ("Polywax" 2000, available from Petrolite Corp., Bareco Div.), 11.5% microcrystalline wax, 160° F. melting point 25.4% unsaturated aliphatic thermoplastic hydrocarbon resin, melting point 100° C.

25.4% dicyclopentadiene alkylation polymer, melting point 77° F., 0.1% butylated hydroxytoluene.

Blend B had the following properties:

| | |
|---|---|
| Ring and ball softening point, ° F. | 209 |
| Viscosity, cps. at 310° F. | 10,300 |
| Tensile, lb./in.$^2$ | 400–500 |
| Tensile elongation, % | 20–25 |

Strength characteristics of the carpet backsized with the above blend according to the process of U.S. Pat. No. 3,551,231 are give in Table III.

TABLE III

Properties of Contract-Type Carpets Made Using Unfilled Reference Blend B

| Carpet No. | Backsize oz./yd.$^2$ | Tuft Bind, lb. | Scrim Bond, lb./3" |
|---|---|---|---|
| C3 | 18.7 | 14.5 | 26.2 |
| C4 | 25.0 | 14.6 | 40.0 |

Data in Table III show a modest improvement in properties compared to the filled, less costly blend A which was used for the samples in Table II. However, the small improvement is not adequate to justify the higher cost for most users.

The higher strength hot melt blends of the present invention are illustrated in Examples 1 and 2, intended for contract carpet use, which follow:

EXAMPLE 1

High-Strength Blend — 30% Filled — For Contract Carpet 19.8% ethylene/vinyl acetate copolymer, melt index 17–21, vinyl acetate content 25%, 2.2% paraffin wax, melting point of about 146° F.

2.9% low molecular weight (2000) polyethylene, density 0.96 g./cm.$^3$, ring and ball softening point (ASTM-E28) 257° F., 45.0% hydrocarbon resin, 60° C. ring and ball softening point, viscosity of 1.0 poise at 135° C. ("Piccovar" L60, available from Hercules Inc.), 0.1% butylated hydroxytoluene, 30.0% calcium carbonate.

Physical properties of this blend are given under Blend No. 1 in Table I. The key physical property — tensile elongation — was 950 percent.

Table IV shows the typical carpet properties attained by use of Blend No. 1:

TABLE IV

Properties of Contract-Type Carpets Made Using Blend No. 1

| Carpet No. | Backsize oz./yd.$^2$ | Tuft Bind, lb. | Scrim Bond, lb./3" |
|---|---|---|---|
| 1 | 22.2 | 18.5 | 27.8 |
| 2 | 27.6 | 21.3 | 31.8 |
| 3 | 25.7 | 18.9 | 29.3 |

All tuft bind values were in excess of 18 lbs., a marked improvement over the 10–13 lbs. Values obtained with the corresponding filled prior art blend (cf. Table II). In many cases, this level of tuft bind will be near the breaking strength of the carpet yarn. In a few cases, where the ultimate in tuft bind value is desired, further improvement (at added cost) can be secured by elimination of filler, as shown in Example 2. The tuft bind value is above 27 lbs./tuft.

EXAMPLE 2

Unfilled High Strength Blend For Contract Carpet 28.3% ethylene/vinyl acetate copolymer, melt index of 17–21, vinyl acetate content 25%, 3.1% paraffin wax, melting point of about 146° F., 4.0% low molecular weight (2000) polyethylene, density 0.96 g./cm.$^3$, ring and ball softening point (ASTM-E28) 257° F., 64.5% hydrocarbon resin, 60° C. ring and ball softening point, viscosity of 1.0 poise at 135° C., 0.1% butylated hydroxytoluene.

Physical properties of this blend are as follows:

| | |
|---|---|
| Ring and ball softening point, ° F. | 238 |
| Viscosity, cps. at 310° F. | 5,337 |
| Tensile, lb./in.$^2$ | 335 |
| Tensile elongation, % | 1090 |

Typical properties of carpet backsized by the above hot melt blend are shown in Table V.

TABLE V

Properties of Contract-Type Carpet Made Using Example 2 Blend

| Carpet No. | Backsize oz./yd.² | Tuft Bind lb. | Scrim Bond lb./3" |
|---|---|---|---|
| 4 | 25.7 | 27.6 | 36.8 |

This value is above the breaking strength for the yarns used in many carpets sold in today's markets, and is almost double the value obtained by the use of the corresponding unfilled prior art blend (i.e., 14.5–14.6 lbs. cf. Table III).

SERIES II — DOMESTIC CARPETS

Blends described heretofore, intended primarily for contract carpet, are also technically highly desirable for use in domestic carpet backsizing, but costs are prohibitive. However, these blends can be modified to include substantial amounts of inert filler to render the cost more attractive and still retain the improvement in tuft bind. Accordingly, the highly filled blend of the present invention employing the novel tackifier resin system yields considerably higher tuft bind than a corresponding highly filled blend employing a widely-used prior art tackifier resin, although, of course, absolute values for both the blends of the present invention and of the prior art will be lower than for less-highly-filled blends of similar composition.

To illustrate the benefits of the invention when applied to highly-filled systems, Reference Blend C, and the blends of Examples 3 and 4 were prepared, all at 60% filler level:

REFERENCE BLEND C — DOMESTIC CARPETS (Widely-Used Good Quality Prior Art Blend)

(Reference: U.S. Pat. 3,745,054)

8.1% ethylene/vinyl acetate copolymer, melt index 17–21, vinyl acetate content 25%.
0.9% paraffin wax, melting point of about 146° F.
1.3% low molecular weight polyethylene (3500 molecular weight, 240° F. melting point, 0.93 gm./cm.³ density).
5.4% microcrystalline wax, melting point 160° F.
12.1% unsaturated aliphatic thermoplastic hydrocarbon resin, melting point 100° C.
12.1% dicyclopentadiene alkylation polymer, melting point 77° F.
0.1% butylated hydroxytoluene.
60.0% calcium carbonate.

EXAMPLE 3

Domestic Carpet Blend — 60% Filled — Based on Improved Tackifier Resin System 8.1% ethylene/vinyl acetate copolymer, melt index 17–21, vinyl acetate content 25%.
0.9% paraffin wax, melting point of about 146° F.
1.8% low molecular weight polyethylene (3500 molecular weight, 240° F. melting point, 0.93 gm./cm.³ density).
29.0% hydrocarbon resin, 60° C. ring and ball softening point, viscosity of 1.0 poise at 135° C.
0.2% butylated hydroxytoluene.
60.0% calcium carbonate.

EXAMPLE 4

Domestic Carpet Blend — 60% Filled — Based on Alternate Improved Tackifier Resin System 7.2% ethylene/vinyl acetate copolymer, melt index 17–21, vinyl acetate content 25%.
0.8% paraffin wax, melting point of about 146° F.
1.9% low molecular weight polyethylene (2000 molecular weight, 0.96 gm./cm.³ density, ring and ball softening point 257° F.).
29.6% hydrocarbon resin, 64° C. ring and ball softening point, viscosity of 1.0 poise at 135° C.
60.5% calcium carbonate.

The relative merits of the prior art blend and the improved blends of the present invention given in Examples 3 and 4 are exhibited in two ways. Table VI provides comparative physcial properties for the three blends; the reference blend clearly has a far lower tensile elongation percentage than does the Example 3 or Example 4 blend. The tensile strength for the reference blend is highest, but, as shown below, this does not result in good tuft bind performance.

Table VII shows clearly that the benefit of the high tensile elongation percentage noted in Table VI carry through, and confer a definite benefit on carpets made with the improved blends. Both tuft bind values and scrim bond values for the carpets made using Example 3 and Example 4 blends are clearly superior to comparable values for the reference blend, even though the carpet style is common and the backsize coating weights are essentially equal.

TABLE VI

Comparative Properties of Fully-compounded 60% Filled Domestic Blends

| Blend | Tensile lb/in² | Tensile Elongation % | Ring & Ball Softening Point ° F. | Viscosity cps. at 310° F. |
|---|---|---|---|---|
| Reference Blend 3 | 350 | 20 | 210 | 1000 |
| Example 3 | 240 | 230 | 211 | 12625 |
| Example 4 | 190 | 105 | 245 | 9400 |

TABLE VII

Properties of Domestic Carpets Made Using Prior Art and Present Invention Blends

| Blend | Carpet No. | Backsize oz./yd.² | Tuft Bind lb. | Scrim Bond lb./3" |
|---|---|---|---|---|
| Reference Blend 3 | 5 | 25.7 | 10.6 | 14.5 |
| Reference Blend 3 | 6 | 26.2 | 12.0 | 13.3 |
| Reference Blend 3 | 7 | 27.2 | 11.1 | 12.1 |

TABLE VII-continued

Properties of Domestic Carpets Made Using Prior Art and Present Invention Blends

| Blend | Carpet No. | Backsize oz./yd.² | Tuft Bind lb. | Scrim Bond lb./3" |
|---|---|---|---|---|
| Example 3 | 8 | 25.4 | 14.5 | 20.8 |
| Example 4 | 9 | 26.0 | 15.0 | 15.5 |
| Example 4 | 10 | 26.9 | 16.5 | 15.3 |
| Example 4 | 11 | 28.2 | 16.6 | 16.3 |

I claim:

1. A composition having a tensile elongation of about 50 to 400 percent comprising
   A. about 3 to 15 weight percent ethylene/vinyl ester copolymer having a melt index of about 2 to 100, a copolymerized ethylene content of about 67 to 90 weight percent, a copolymerized vinyl ester content of about 10 to 33 weight percent, wherein the acid moiety of said vinyl ester contains 1–4 carbon atoms,
   B. about 15 to 40 weight percent of a hydrocarbon resin or a mixture of several hydrocarbon resins having a ring and ball softening point of about 50°–70° C. and a viscosity of 0.5 to 1.5 poise at 135° C.,
   C. 0 to about 3 weight percent of a low molecular weight ethylene homopolymer having a molecular weight of about 1500–4000, density of 0.91–0.96 g./cm.³ and a melting point of about 220° F.–270° F.
   D. 0 to about 3 weight percent of a paraffin wax,
   E. 0 to 0.3 weight percent of an antioxidant, and
   F. about 40 to 75 percent filler.

2. The composition of claim 1 having a tensile elongation of at least about 200 percent.

3. A carpet comprised of a primary backing material stitched with closely spaced erect loops of yarn to form a tufted structure, the bottom surface of the tufted structure having as a tuft bonding backsize adhesive coating the composition of claim 1, said carpet having an average tuft bind of at least 10 pounds.

4. The composition of claim 1 wherein said ethylene/vinyl ester copolymer is present in about 5 to 10 weight percent and has a melt index of about 10 to 25.

5. The composition of claim 4 wherein said copolymerized vinyl ester content is about 23 to 26 weight percent and the acid moiety thereof contains 2 to 3 carbon atoms.

6. A carpet comprised of a primary backing material stitched with closely spaced erect loops of yarn to form a tufted structure, the bottom surface of the tufted structure having as a tuft bonding backsize adhesive coating the composition of claim 5, said carpet having an average tuft bind of at least 10 pounds.

7. The composition of claim 5 wherein said hydrocarbon resin is present in about 25 to 35 weight percent.

8. The composition of claim 7 having a tensile elongation of at least about 200 percent.

9. The composition of claim 8 wherein said vinyl ester is vinyl acetate.

10. A carpet comprised of a primary backing material stitched with closely spaced erect loops of yarn to form a tufted structure, the bottom surface of the tufted structure having as a tuft bonding backsize adhesive coating the composition of claim 17, said carpet having an average tuft bind of at least 10 pounds.

* * * * *